US007987361B2

(12) United States Patent
Han et al.

(10) Patent No.: US 7,987,361 B2
(45) Date of Patent: Jul. 26, 2011

(54) METHOD OF COPYING AND DECRYPTING ENCRYPTED DIGITAL DATA AND APPARATUS THEREFOR

(75) Inventors: Hee-chul Han, Suwon-si (KR);
Yun-sang Kim, Suwon-si (KR);
Yang-lim Choi, Seongnam-si (KR);
Sung-hyu Han, Seoul (KR); Yong-kuk You, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1169 days.

(21) Appl. No.: 10/958,237

(22) Filed: Oct. 6, 2004

(65) Prior Publication Data

US 2005/0108560 A1 May 19, 2005

(30) Foreign Application Priority Data

Nov. 13, 2003 (KR) ........................ 10-2003-0080092

(51) Int. Cl.
*H04L 29/06* (2006.01)
(52) U.S. Cl. .............................. 713/167; 726/31; 726/32
(58) Field of Classification Search .................... 713/167
See application file for complete search history.

(56) References Cited

U.S. PATENT DOCUMENTS

| | | | | |
|---|---|---|---|---|
| 5,457,746 A | * | 10/1995 | Dolphin | 705/51 |
| 5,661,799 A | * | 8/1997 | Nagel et al. | 705/52 |
| 5,784,464 A | * | 7/1998 | Akiyama et al. | 713/155 |
| 5,857,021 A | * | 1/1999 | Kataoka et al. | 705/54 |
| 6,044,155 A | * | 3/2000 | Thomlinson et al. | 713/155 |
| 6,061,451 A | * | 5/2000 | Muratani et al. | 380/201 |
| 6,106,396 A | * | 8/2000 | Alcorn et al. | 463/29 |
| 6,367,019 B1 | * | 4/2002 | Ansell et al. | 726/26 |
| 6,609,116 B1 | | 8/2003 | Lotspiech | |
| 2002/0176575 A1 | * | 11/2002 | Qawami et al. | 380/201 |
| 2003/0081792 A1 | * | 5/2003 | Nakano et al. | 380/286 |

FOREIGN PATENT DOCUMENTS

| | | |
|---|---|---|
| JP | 2003-204320 A | 7/2003 |
| KR | 2001-0078491 A | 8/2001 |
| KR | 2003-0014638 A | 2/2003 |
| WO | WO 02/067548 A1 | 8/2002 |

* cited by examiner

*Primary Examiner* — Nabil M El Hady
*Assistant Examiner* — Dant B Shaifer Harriman
(74) *Attorney, Agent, or Firm* — Sughrue Mion, PLLC

(57) ABSTRACT

A method of and an apparatus for copying and decrypting encrypted digital data. The method of copying encrypted digital data includes encrypting a first media key block to be used for decryption of the encrypted digital data using a predetermined key of a second information storage medium and storing the encrypted digital data and the encrypted first media key block in the second information storage medium. Security of data encryption is heightened by not discarding an encryption key used for an initial encryption, encrypting the encryption key used for initial encryption using another encryption key used for a second encryption, and storing the encrypted encryption key with the data. Also, since unnecessary decryption and encryption of data are not repeated, the time required for copying data is reduced, and since data is transferred between apparatuses in an encrypted state, a security level is higher.

25 Claims, 6 Drawing Sheets

US 7,987,361 B2

METHOD OF COPYING AND DECRYPTING ENCRYPTED DIGITAL DATA AND APPARATUS THEREFOR

CROSS REFERENCE TO RELATED APPLICATIONS

This application claims priority from Korean Patent Application No. 2003-80092, filed on Nov. 13, 2003, in the Korean Intellectual Property Office, the disclosure of which is incorporated herein in its entirety by reference.

BACKGROUND OF THE INVENTION

1. Field of the Invention

The present invention relates to digital data processing, and more particularly, to a method of copying encrypted data and an apparatus therefor.

2. Description of the Related Art

Digital data is used in various areas such as digital media, networks, and computing devices. However, since digital data can be copied an infinite number of times without a change in quality, in a communication system such as a computer network and a remote communication system, security and maintenance of digital data is attempted by encrypting digital data, transmitting the encrypted digital data, and allowing only authorized users to use the encrypted digital data. Also, even when digital data is recorded in an information storage medium, digital data is encrypted and recorded so that only the authorized users can use the encrypted digital data.

When data has been encrypted and recorded in a certain storage medium, there exists a case in which the data is copied to another storage medium. If an encryption algorithm and a secret key for the encryption process, used when the data was recorded in the first storage medium, are the same as those of the second storage medium, data to be copied can be read from the first storage medium and recorded in the second storage medium as the data is encrypted. However, in accordance with this method, when the secret key is exposed to other people, the data is vulnerable to hacking. Therefore, to raise the security level of data, unique encryption algorithms are used for each storage medium, or if the same encryption algorithm is used, unique encryption keys are used for each storage medium. In a case where unique encryption algorithms are used for each storage medium (including a case where unique encryption keys are used for each storage medium), a conventional method of copying data between storage media is as follows.

First, after reading corresponding data from a first storage medium storing encrypted data, decrypted data is obtained by applying a decryption algorithm corresponding to an encryption algorithm of the first storage medium to the corresponding data. Next, after encrypting the decrypted data by applying an encryption algorithm of a second storage medium to the decrypted data, the newly encrypted data is recorded in the second storage medium.

In the conventional method of copying data, whenever data is copied, encryption and decryption processes requiring complicated calculations must be performed, and since decrypted, i.e., non-encrypted, data is transferred between storage media, the conventional method is vulnerable to security breaches.

SUMMARY OF THE INVENTION

The present invention provides a method of and an apparatus for decrypting encrypted digital data.

The present invention also provides a method of and an apparatus for effectively copying digital data while maintaining security levels of encryption methods between storage media, each storage medium using a unique encryption method to record the data.

The present invention also provides a method of and an apparatus for decrypting digital data copied by the copying method and the copying apparatus.

The present invention also provides a computer readable medium having recorded thereon a computer readable program for performing the method of copying and decrypting digital data.

According to an aspect of the present invention, there is provided a method of decrypting encrypted digital data stored in an information storage medium, the method comprising: (a) obtaining a media key by decrypting a media key block of the information storage medium using a device key of a device including the information storage medium; and (b) decrypting the encrypted digital data using the media key.

According to another aspect of the present invention, there is provided a method of copying encrypted digital data stored in a first information storage medium to a second information storage medium, the method comprising: (a) encrypting a first media key block to be used for decryption of the encrypted digital data using a predetermined key of the second information storage medium; and (b) storing the encrypted digital data and the encrypted first media key block in the second information storage medium.

According to another aspect of the present invention, there is provided a method of decrypting encrypted digital data stored in a second information storage medium in which a first media key block copied from a first information storage medium has been encrypted and stored, the method comprising: (a) obtaining the first media key block by decrypting the encrypted first media key block using a predetermined key of the second information storage medium; (b) obtaining a first media key by decrypting the first media key block using a device key of a device including the second information storage medium; and (c) decrypting the encrypted digital data using the first media key.

According to an aspect of the present invention, there is provided an apparatus for decrypting encrypted digital data stored in an information storage medium, the apparatus comprising: a first decryption unit, which obtains a media key by decrypting a media key block of the information storage medium using a device key of a device including the information storage medium; and a second decryption unit, which decrypts the encrypted digital data using the media key.

According to another aspect of the present invention, there is provided an apparatus for copying encrypted digital data stored in a first information storage medium to a second information storage medium, the apparatus comprising: a media key block encryption unit, which encrypts a first media key block to be used for decryption of the encrypted digital data using a predetermined key of the second information storage medium; and a data storage unit, which stores the encrypted digital data and the encrypted first media key block in the second information storage medium.

According to another aspect of the present invention, there is provided an apparatus for decrypting encrypted digital data stored in a second information storage medium in which a first media key block copied from a first information storage medium has been encrypted and stored, the apparatus comprising: a first decryption unit, which obtains the first media key block by decrypting the encrypted first media key block using a predetermined key of the second information storage medium; a second decryption unit, which obtains a first media key by decrypting the first media key block using a device key of a device including the second information storage medium; and a third decryption unit, which decrypts the encrypted digital data using the first media key.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, with reference to the attached drawings, a method of and an apparatus for copying and decrypting encrypted data according to the present invention will now be described in detail.

In general, since efficiency and security are inversely proportional to one another in encryption algorithms, in a case where two encryption algorithms having different efficiencies and different securities exist, overall efficiency and security can be much higher when the two algorithms are applied one by one.

For example, a hybrid method, which mixes a symmetric-key encryption technology and an open-key encryption technology used for encrypting data, exists. In the symmetric-key encryption technology, a secret key is commonly used in an encryption process and a decryption process. However, in the open-key encryption technology, keys used in the encryption process and the decryption process are different from one another. That is, an open-key is used for encrypting data, and a secret key mathematically related to the open-key is used for decrypting the data. In general, the open-key encryption technology is safer but less efficient than the symmetric-key encryption technology. Therefore, the hybrid method mixing the two technologies is used. In hybrid encryption technology, a large amount of data (plaintext) is encrypted by the symmetric-key encryption technology in advance, and a symmetric-key used for the symmetric-key encryption is also encrypted by the open-key encryption technology. When the encrypted symmetric-key and the encrypted plaintext are received, the symmetric-key is decrypted using an internal secret key, and the encrypted plaintext is decrypted using the decrypted symmetric-key. A process obtaining original plaintext using the hybrid encryption technology requires less time than a case using common open-key encryption technology. Also, security of a symmetric-key algorithm can be improved using different symmetric-keys for all plaintext data.

Also, in a case where two symmetric-key encryption algorithms having different efficiencies and different securities exist, when plaintext data is encrypted by a more efficient algorithm and a symmetric-key used for the encryption is encrypted by a safer algorithm, efficiency and security of overall encryption process can be improved.

If a large amount of media content is encrypted using one encryption key in a first step and an encryption key set is generated by encrypting the encryption key of the first step by different encryption keys for each receiver in a second step, encryption expenses can be reduced and security can be improved while several permitted receivers use the same contents.

A media key block (MKB) is a block of encrypted media keys that adopts the above concept.

Figure 1:
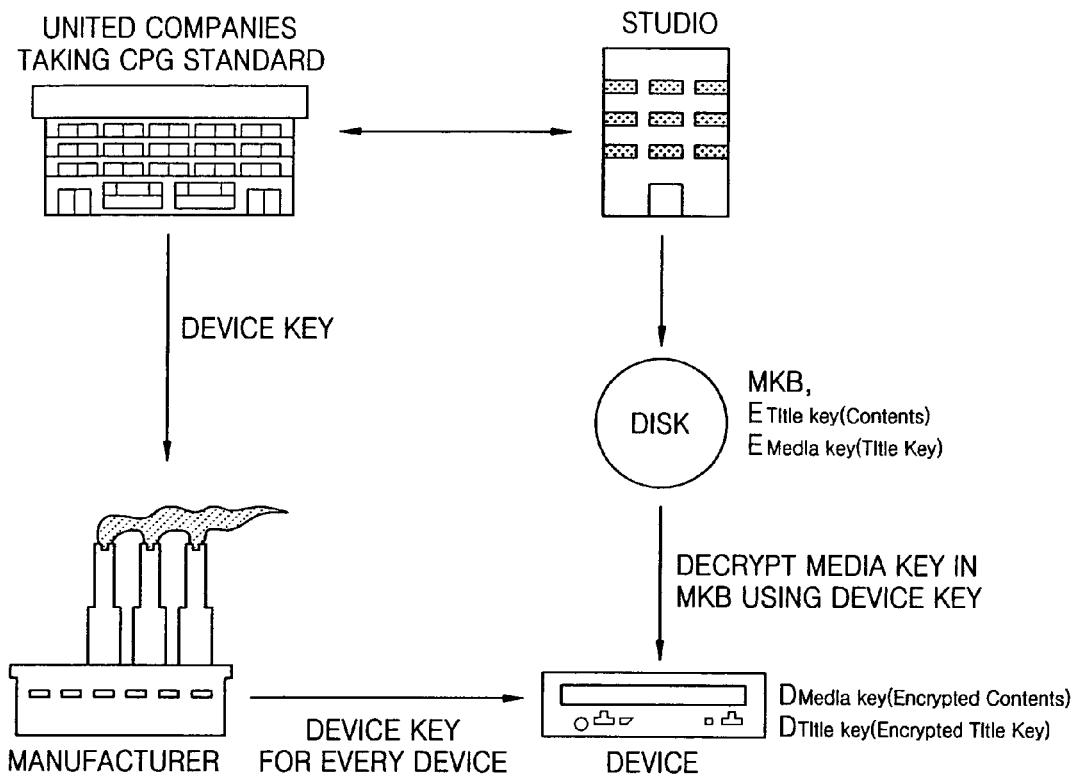
FIG. 1 is an example of encrypting media contents using a media key block and storing the media contents in an information storage medium and shows a case of content protection for recordable media (CPRM)

FIG. 1 is an example of encrypting media contents using a media key block and storing the media contents in an information storage medium and shows a case of content protection for recordable media (CPRM).

With reference to FIG. 1, a plurality of companies form a contents production group (CPG) standard consortium by uniting to protect media contents, i.e., digital data. The united companies supply device keys, which are unique encryption keys for devices, to a manufacturer. The device keys supplied to the manufacturer are loaded in the devices by applying tamper resistance, i.e., a technology preventing the devices from being attacked by outside sources.

In a studio, media contents, such as moving picture data, still image data, and audio data, are produced and encrypted by title keys, i.e., unique encryption keys of contents. When the encrypted contents and the title keys must be stored in storage media to supply them to users, the title keys are encrypted using media keys i.e., unique encryption keys of the storage media.

To reproduce the encrypted contents from an information storage medium using a device, a user must know a media key. If the media key is stored in the information storage medium without encryption, anyone can decrypt the encrypted contents using the media key. To prevent such a possibility, the device key and the media key need to correspond with one another.

Figure 2:
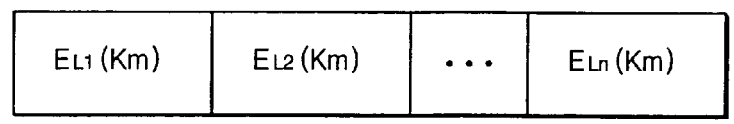
FIG. 2 is a configuration of a media key block.

FIG. 2 is a configuration of a media key block.

With reference to FIG. 2, a media key block is composed of $E_{L1}(Km), E_{L2}(Km), \ldots, E_{Ln}(Km)$, which are values encrypting a media key Km by unique device keys L1, L2, ..., Ln, respectively. Each media key block is stored in a separate information storage medium.

Figure 3:
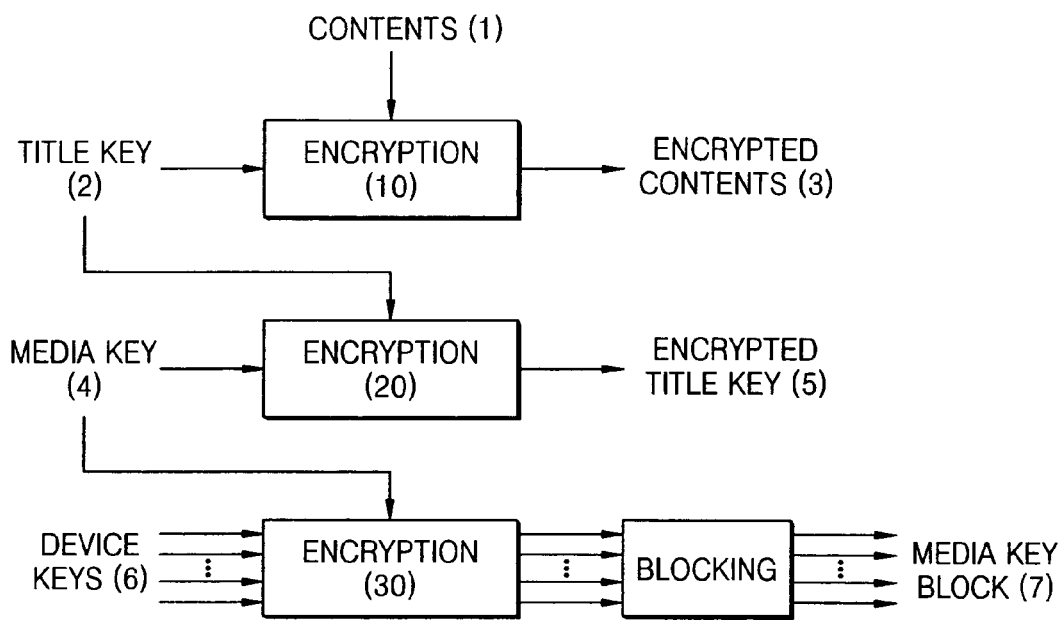
FIG. 3 is a block diagram illustrating an encryption process for encrypting contents and storing the contents in information storage media.

FIG. 3 is a block diagram illustrating an encryption process for encrypting contents 1 and storing the contents 1 in an information storage medium.

First, every medium has a unique media key 4. A media key block 7 is generated by encrypting each media key 4 using a plurality of device keys 6 in step 30 and blocking them. The media key block 7 is stored in the information storage medium. This process is generally achieved in advance before the contents 1 are stored.

To encrypt and store the contents, first, the contents 1 are encrypted in step 10 using a title key 2, and the title key 2 is encrypted in step 20 using the media key 4. Then, the encrypted contents 3 and the encrypted title key 5 are stored in the information storage medium.

The media key 4 for encrypting the title key 2 must be obtained from the media key block 7 stored in the information storage medium.

Figure 4:
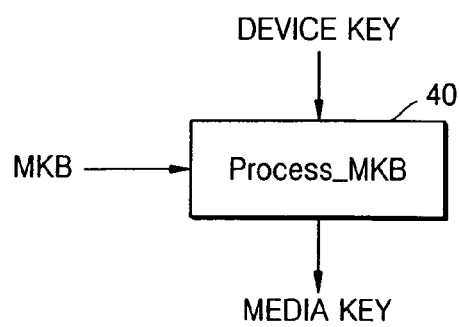
FIG. 4 is a block diagram illustrating a Process_MKB function decrypting a media key from a media key block.

FIG. 4 is a block diagram illustrating a Process_MKB function 40 decrypting a media key from a media key block. To extract the media key from the media key block, a device key is necessary. To store contents as shown in FIG. 3, a device key of a storage apparatus is used. $E_{Li}(Km)$ corresponding to a proper apparatus is read, and the media key Km is obtained by decrypting, in step 40, $E_{Li}(Km)$ using the device key Li.

Figure 5:
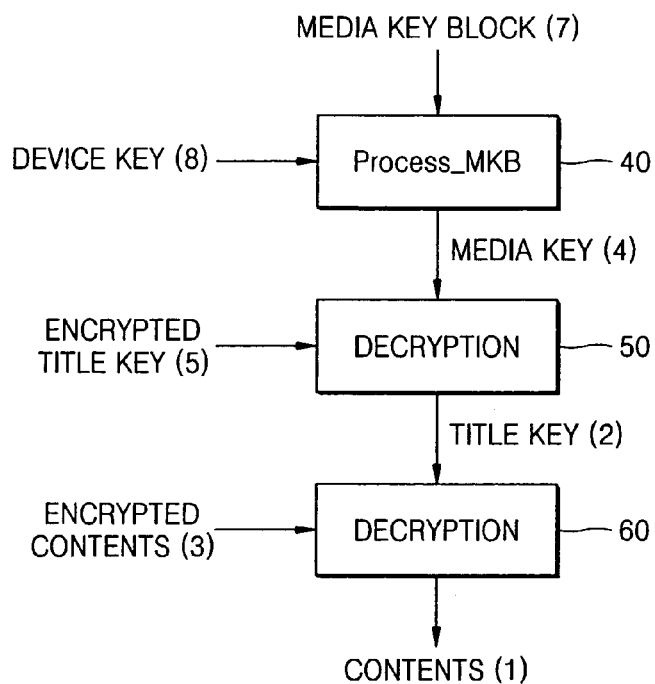
FIG. 5 is a block diagram illustrating a method of decrypting and reproducing encrypted contents using the media key block.

FIG. 5 is a block diagram illustrating a method of decrypting and reproducing encrypted contents using the media key block.

With reference to FIG. 5, a portion corresponding to a reproduction apparatus is read from a media key block 7 stored in an information storage medium, and a media key 4 is obtained by decoding, in step 40, the portion using a device key 8 of the reproduction apparatus. Next, a title key 2 is obtained by decrypting, in step 50, an encrypted title key 5 using the media key 4. Finally, desired contents 1 can be obtained by decrypting, in step 60, encrypted contents 3 using the title key 2.

Figure 6:
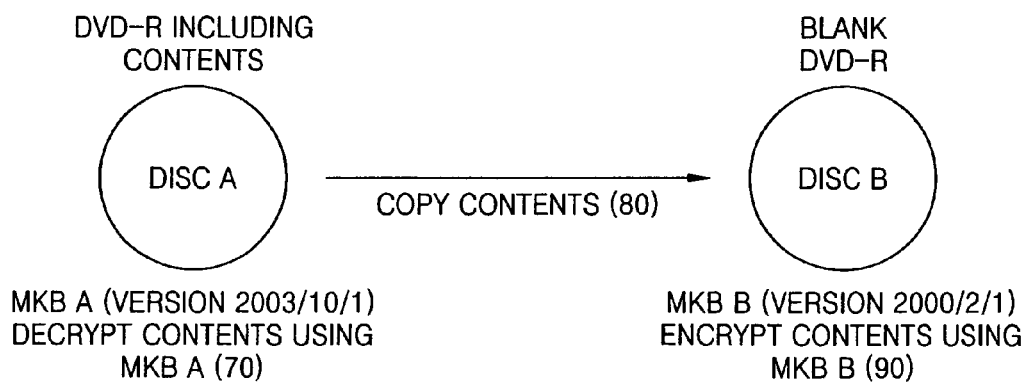
FIG. 6 is a drawing illustrating a conventional method of copying contents.

FIG. 6 is a drawing illustrating a conventional method of copying contents.

In the conventional method, to copy encrypted contents from disc A including the contents to disc B, the encrypted contents are decrypted in step 70 using a media key block of disc A, the decrypted contents are re-encrypted in step 90 using a media key block of disc B, and the re-encrypted contents are stored in the disc B.

In the conventional method, when the decrypted contents are transmitted in step 80 to a different device, the contents can be exposed to an attacker. Also, there is a case in which encryption is performed by discarding a media key block of a new encryption method and using a former media key block. As in FIG. 6, if the media key block of disc A was made, for example, on Oct. 1, 2003 and the media key block of disc B was made on Feb. 1, 2000, in a case where the media key block of disc B has been analyzed by and exposed to an attacker, the conventional method of copying contents cannot prevent the attacker from copying media contents.

In a case where an attacker has known a media key using a certain device, thereafter, media key blocks are newly generated so that the device key of the corresponding device cannot be used when information storage apparatuses are manufactured. This is called revocation of a device. Since the media key block is continuously being updated by performing the process of device revocation, it is preferable that contents are encrypted using the most recent media key block possible.

Figure 7:
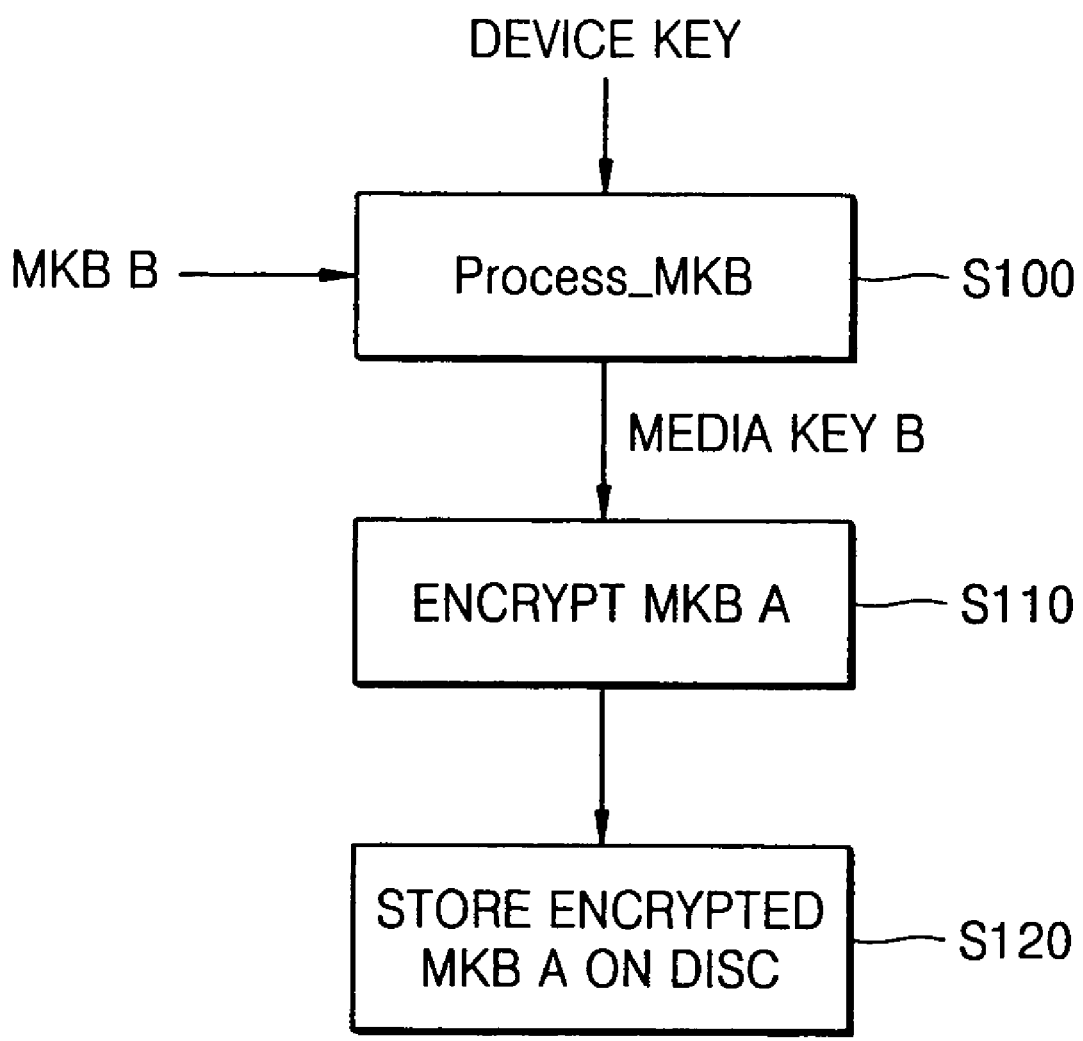
FIG. 7 is a flowchart of a process of generating a media key block extension by a method of copying contents according to the present invention.

FIG. 7 is a flowchart of a process of generating a media key block extension by a method of copying contents according to the present invention.

The media key block extension is a media key block in which a media key block of disc A, encrypted using a media key of disc B, is added to a media key block of disc B. That is, in disc B, besides its own media key block, the encrypted media key block of disc A is also stored.

First, a media key B of the media key block of disc B is decrypted in step s100 using a device key of a storage apparatus for copying contents. The media key block of disc A is encrypted in step s110 using the media key B. The encrypted media key block of disc A is stored in disc B according to step s120.

Next, a title key encrypted using a media key of disc A and contents encrypted using the title key are read from disc A and stored in disc B.

Therefore, in a method of copying contents according to the present invention, since processes of decrypting encrypted contents and re-encrypting the decrypted contents are not necessary, the time required for copying contents is reduced.

To reproduce copied contents described above, several processes are added to a conventional method of reproducing contents.

Figure 8:
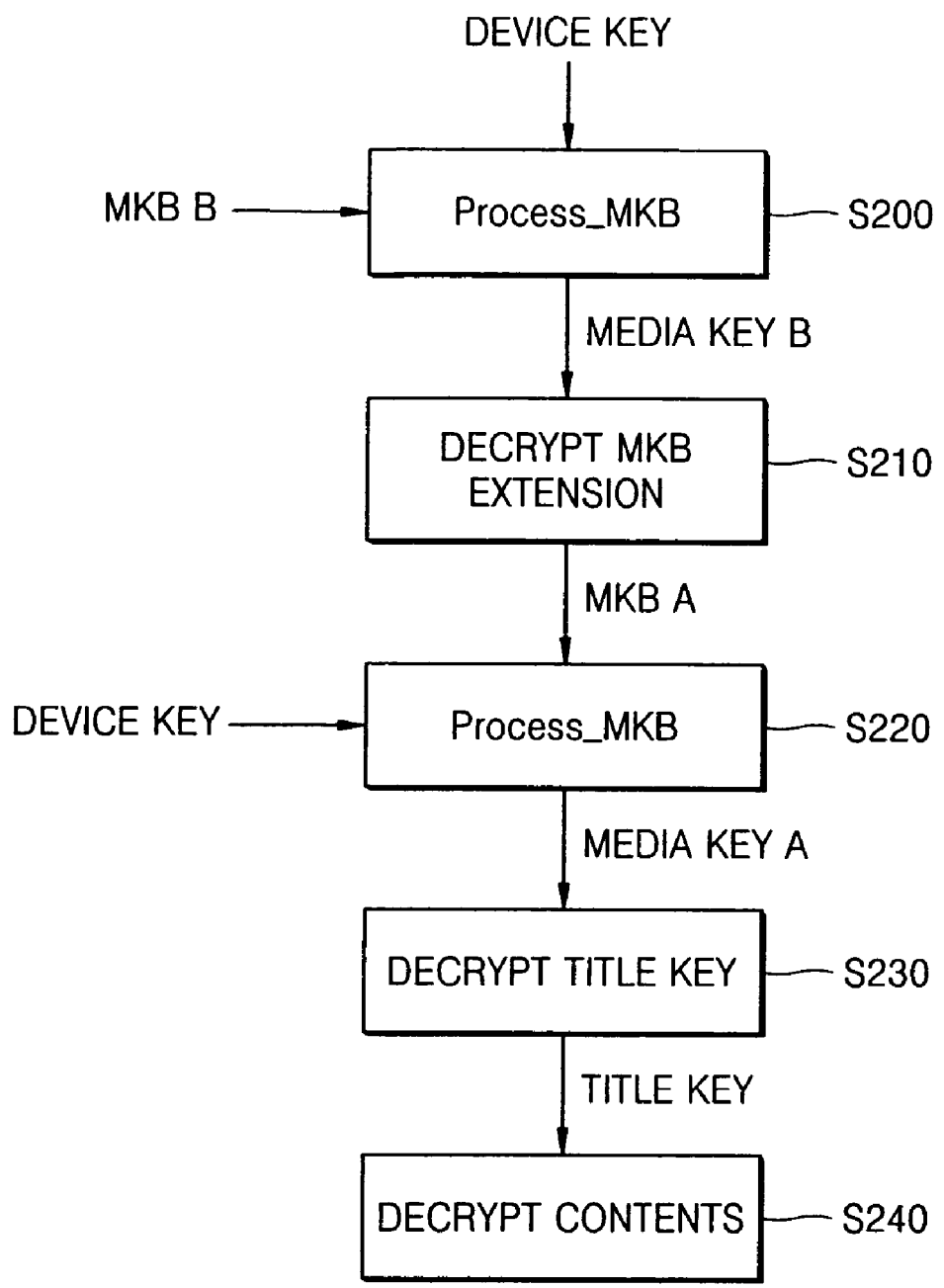
FIG. 8 is a flowchart of a method of decrypting copied contents to reproduce the contents copied by a method of copying contents according to the present invention.

FIG. 8 is a flowchart of a method of decrypting copied contents to reproduce the contents copied by a method of copying contents according to the present invention.

A media key B is obtained in step s200 by decrypting a corresponding portion of a media key block of disc B including contents using a device key of a reproduction apparatus. A media key block of disc A in a media key block extension is decrypted in s210 using the media key B. A media key A is obtained in step s220 by decrypting a portion corresponding to the reproduction apparatus of the decrypted media key block of disc A using the device key. A title key is decrypted in s230 using the media key A. Encrypted contents are decrypted in step s240 using the title key.

As described above, in the present invention, contents are encrypted twice over by not discarding a media key block used for initial encryption, encrypting the media key block used for initial encryption using a media key block of a second information storage medium, and storing the encrypted media key block. Therefore, the security of encrypting contents can be higher. Also, since the contents are not decrypted or encrypted differently from a conventional method of copying contents, any amount of unnecessary calculations can be reduced. Therefore, the time required for copying contents is reduced.

Besides copying contents between discs, the present invention can be applied to various areas, such as a case in which digital rights management (DRM) is handled on a home network.

Figure 9:
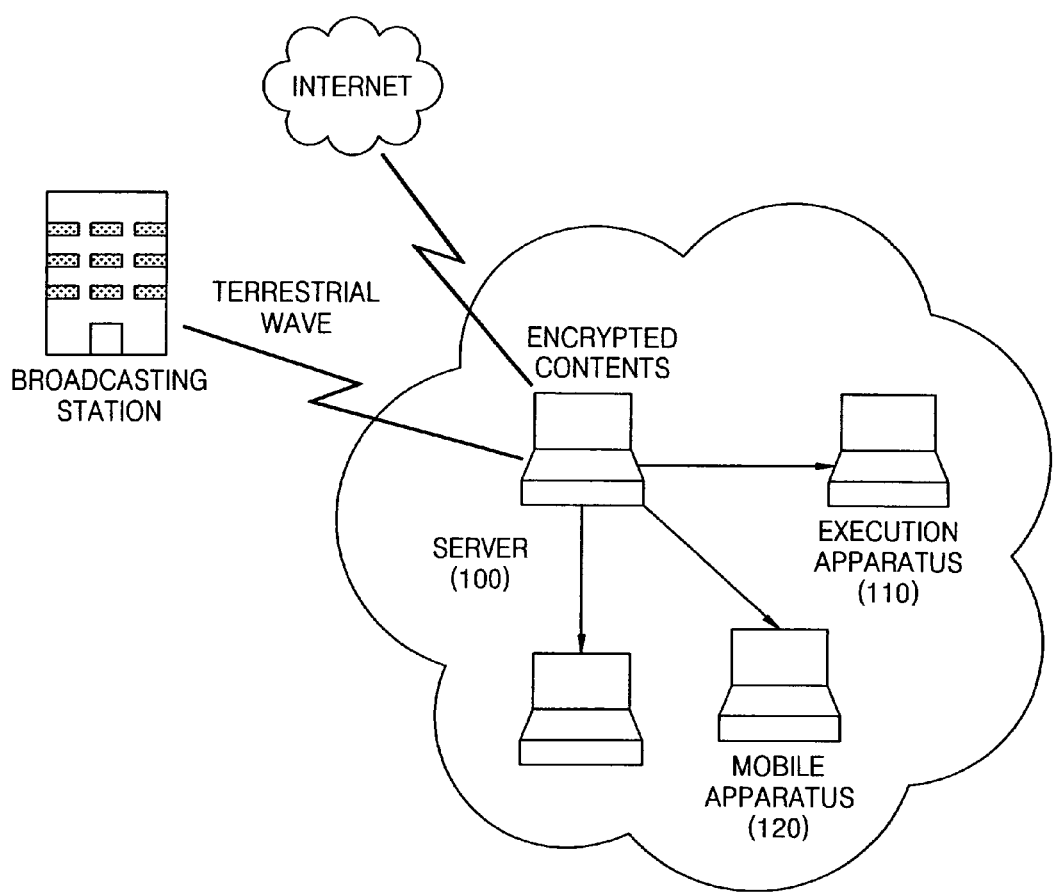
FIG. 9 is an embodiment of applying a method of copying contents according to the present invention to a home network.

FIG. 9 illustrates an embodiment of applying a method of copying contents according to the present invention to a home network.

First, encrypted contents are transferred over the Internet or terrestrial broadcasting networks and stored in a server 100. Next, when the encrypted contents are copied to an execution apparatus 110 or a mobile apparatus 120, the encrypted contents are copied without being decrypted, and an encryption key used for the encrypted contents is encrypted and stored using an encryption key used in the execution apparatus 110 or the mobile apparatus 120. When the encrypted contents are reproduced, after the encryption key used for the encrypted contents has been decrypted using an encryption key used in a reproduction apparatus, the encrypted contents are decrypted using the decrypted encryption key.

The present invention may be embodied in a general-purpose computer (including apparatuses having an information processing function, and more particularly, a user terminal) by running a program from a computer readable medium, including but not limited to storage media such as ROMs, RAMs, flash memories, magnetic storage media (floppy disks, hard disk, magnetic tapes, etc.), optically readable media (CD-ROMs, DVDs, etc.), and carrier waves (transmission over the Internet).

By a method of and an apparatus for copying encrypted data according to the present invention, there is higher security in data encryption by not discarding an encryption key used for an initial encryption, encrypting the encryption key used for initial encryption using another encryption key used for a second encryption, and storing the encrypted encryption key with the data. Also, since unnecessary decryption and encryption of data are not repeated, the time required for copying data can be reduced, and since data is transferred between apparatuses in an encrypted state, security can be higher.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of copying encrypted digital data stored in a first information storage medium to a second information storage medium, the method comprising:
   (a) encrypting a first media key block to be used for decryption of the encrypted digital data using a predetermined key of the second information storage medium; and
   (b) then storing the encrypted digital data and the encrypted first media key block in the second information storage medium,
   wherein the predetermined key of the second information storage medium is a second media key uniquely granted to the second information storage medium, and
   wherein the first media key block comprises a first encrypted media key, generated by encrypting a media key by a first device key, and a second encrypted media key, generated by encrypting the media key by a second device key.

2. The method of claim 1, further comprising:
   (c) obtaining the second media key by decrypting a second media key block using a device key of a device including the second information storage medium,
   wherein the second media key block is a set of values in which the second media key is encrypted using a predetermined device key.

3. The method of claim 1, wherein the digital data has been encrypted using a title key, and further comprising:
   (c) storing the title key in the second information storage medium.

4. The method of claim 3, wherein the title key is an encryption key uniquely granted to the digital data.

5. The method of claim 1, wherein the first media key block is a set of values in which a first media key uniquely granted to the first information storage medium is encrypted using a predetermined device key.

6. A method of decrypting encrypted digital data stored in a second information storage medium in which a first media key block copied from a first information storage medium has been encrypted and recorded, the method comprising:
   (a) decrypting the encrypted first media key block using a first key of the second information storage medium;
   (b) obtaining a first media key from the decrypted first media key block using a second key of a device including the second information storage medium; and
   (c) decrypting the encrypted digital data using the first media key.

7. The method of claim 6, wherein the first media key block is a set of values in which the first media key uniquely granted to the first information storage medium is encrypted using a predetermined device key.

8. The method of claim 6, wherein the first key of the second information storage medium is an encrypted second media key uniquely granted to the second information storage medium.

9. The method of claim 8, wherein step (a) comprises:
   (a1) obtaining the second media key by decrypting a second media key block using a device key of the device including the second information storage medium; and
   (a2) obtaining the first media key block by decrypting the encrypted first media key block using the second media key,
   wherein the second media key block is a set of values in which the second media key is encrypted using a predetermined device key.

10. The method of claim 6, wherein an encrypted title key used for decrypting the encrypted digital data is further stored in the second information storage medium, and
    step (c) comprises:
    (c1) decrypting the encrypted title key using the first media key; and
    (c2) decrypting the encrypted digital data using the decrypted title key.

11. An apparatus for copying encrypted digital data stored in a first information storage medium to a second information storage medium, the apparatus comprising:
    a media key block encryption unit, which encrypts a first media key block to be used for decryption of the encrypted digital data using a predetermined key of the second information storage medium; and
    a data storage unit, which stores the encrypted digital data and the encrypted first media key block in the second information storage medium after the media key block encryption unit has encrypted the first media key block using the predetermined key of the second information storage medium,
    wherein the predetermined key of the second information storage medium is a second media key uniquely granted to the second information storage medium, and
    wherein the first media key block comprises a first encrypted media key, generated by encrypting a media key by a first device key, and a second encrypted media key, generated by encrypting the media key by a second device key.

12. The apparatus of claim 11, further comprising:
    a media key decryption unit, which obtains the second media key by decrypting a second media key block using a device key of a device including the second information storage medium,
    wherein the second media key block is a set of values in which the second media key is encrypted using a predetermined device key.

13. The apparatus of claim 11, wherein the digital data has been encrypted using a title key, and further comprising:
    a title key storage unit, which stores the title key in the second information storage medium.

14. The apparatus of claim 13, wherein the title key is an encryption key uniquely granted to the digital data.

15. The apparatus of claim 11, wherein the first media key block is a set of values in which a first media key uniquely granted to the first information storage medium is encrypted using a predetermined device key.

16. An apparatus for decrypting encrypted digital data stored in a second information storage medium in which a first media key block copied from a first information storage medium has been encrypted and stored, the apparatus comprising:
    a first decryption unit, which decrypts the encrypted first media key block using a first key of the second information storage medium;

a second decryption unit, which obtains a first media key from the decrypted first media key block using a second key of a device including the second information storage medium; and a third decryption unit, which decrypts the encrypted digital data using the first media key.

17. The apparatus of claim 16, wherein the first media key block is a set of values in which the first media key uniquely granted to the first information storage medium is encrypted using a predetermined device key.

18. The apparatus of claim 16, wherein the first key of the second information storage medium is an encrypted second media key uniquely granted to the second information storage medium.

19. The apparatus of claim 18, wherein the first decryption unit comprises:

a media key decryption unit, which obtains the second media key by decrypting a second media key block using a device key of the device including the second information storage medium; and a media key block decryption unit, which obtains the first media key block by decrypting the encrypted first media key block using the second media key, wherein the second media key block is a set of values in which the second media key is encrypted using a predetermined device key.

20. The apparatus of claim 16, wherein an encrypted title key used for decrypting the encrypted digital data is further stored in the second information storage medium, and the third decryption unit comprises:

a title key decryption unit, which decrypts the encrypted title key using the first media key; and a data decryption unit, which decrypts the encrypted digital data using the decrypted title key.

21. A Non-Transitory computer readable medium having recorded thereon a computer readable program for performing a method of copying encrypted digital data stored in a first information storage medium to a second information storage medium, the method comprising:

(a) encrypting a first media key block to be used for decryption of the encrypted digital data using a predetermined key of the second information storage medium; and (b) then storing the encrypted digital data and the encrypted first media key block in the second information storage medium, wherein the predetermined key of the second information storage medium is a second media key uniquely granted to the second information storage medium and wherein the first media key block comprises a first encrypted media key, generated by encrypting a media key by a first device key, and a second encrypted media key, generated by encrypting the media key by a second device key.

22. A Non-Transitory computer readable medium having recorded thereon a computer readable program for performing a method of decrypting encrypted digital data stored in a second information storage medium in which a first media key block copied from a first information storage medium has been encrypted and stored, the method comprising:

(a) decrypting the encrypted first media key block using a first key of the second information storage medium;

(b) obtaining a first media key by decrypting from the decrypted first media key block using a second key of a device including the second information storage medium; and (c) decrypting the encrypted digital data using the first media key.

23. The method of claim 1, wherein the encrypting of (a) is performed by a first device comprising the first information storage medium before transmission to a second device comprising the second information storage medium for the storing of (b).

24. The method of claim 2, wherein the encrypting the first media block comprises encrypting the first media key block using the second media key that is previously obtained in the obtaining.

25. The method of claim 6, wherein the first media key block comprises a first encrypted media key, generated by encrypting a media key by a first device key, and a second encrypted media key, generated by encrypting the media key by a second device key.

* * * * *